United States Patent

Sheu et al.

[11] Patent Number: 6,049,178
[45] Date of Patent: Apr. 11, 2000

[54] CIRCUIT FOR CONTROLLING OPERATION OF AN EMERGENCY EXIT LAMP

[76] Inventors: Tyng-Jeng Sheu; Chia-Ming Hsu, both of No. 12, Alley 25, Lane 254, Shan-Chiao Rd., Niao-Sung Hsiang, Kaohsiung Hsien, Taiwan

[21] Appl. No.: 09/234,176

[22] Filed: Jan. 19, 1999

[51] Int. Cl.[7] .............................. H05B 37/00; G05F 1/00
[52] U.S. Cl. ............................ 315/291; 315/86; 315/171; 307/64
[58] Field of Search ................................ 315/86, 87, 171, 315/172, 176, 200 R, 209 R, 224, 225, 287, 291, 360, DIG. 5, DIG. 7; 307/64, 66, 153, 157

[56] References Cited

U.S. PATENT DOCUMENTS

| | | | |
|---|---|---|---|
| 5,004,953 | 4/1991 | McDonald | 315/DIG. 7 |
| 5,015,919 | 5/1991 | Vila-Masot et al. | 315/86 |
| 5,187,413 | 2/1993 | Araki et al. | 315/291 |
| 5,811,938 | 9/1998 | Rodriguez | 315/360 |
| 5,955,843 | 9/1999 | Nuckolls et al. | 307/64 |
| 5,986,407 | 11/1999 | Chang | 315/171 |

*Primary Examiner*—Don Wong
*Assistant Examiner*—Thuy Vinh Tran
*Attorney, Agent, or Firm*—Harness, Dickey & Pierce, P.L.C.

[57] ABSTRACT

In a circuit for controlling operation of an emergency exit lamp, a delay circuit enables a trigger circuit a preset time period after a power outage has occurred. Once enabled, the trigger circuit activates a relay so as to connect a storage battery to an oscillator. The oscillator is thus enabled to generate a high voltage alternating current signal to activate the lamp to generate a light output in the event of a power outage.

5 Claims, 4 Drawing Sheets

CIRCUIT FOR CONTROLLING OPERATION OF AN EMERGENCY EXIT LAMP

BACKGROUND OF THE INVENTION

1. Field of the Invention

The invention relates to a lamp control circuit, more particularly to a circuit for controlling operation of an emergency exit lamp that can prolong the service life of the lamp and that can ensure sufficient brightness of the light output of the lamp.

2. Description of the Related Art

Emergency exit lamps are installed in hallways and exits of a building to guide people to safety in the event of an emergency situation. They also serve as back-up light sources in the event of a power outage.

FIG. 1 illustrates a conventional lamp control circuit 1 for controlling operation of an emergency exit lamp that includes first and second lamp units 10, 12. When electric power is supplied by an external alternating current (ac) power source (V1), lamp ballast 14 activates directly the first lamp unit 10 to generate a light output. In the event of a power outage, oscillator 18 converts the voltage output of storage battery 16 to activate directly the second lamp unit 12. The first lamp unit 10 is extinguished at this time. However, while the effect of indicating an emergency exit can be achieved under all conditions with the use of the lamp control circuit 1, the following drawbacks arise during practical use of the conventional circuit 1:

1. In the event of a power outage, the oscillator 18 converts the direct current (dc) voltage output of the storage battery 16 into a high voltage ac output for activating the second lamp unit 12. Power consumption is increased because of the large amount of current that flows instantaneously to the second lamp unit 12.

2. Due to the large amount of current that flows instantaneously to the second lamp unit 12 when the latter is activated, the temperature of electrical components in the vicinity of the second lamp unit 12 is increased and can lead to a reduction in the service lives of the second lamp unit 12 and the electrical components.

3. Because the power consumed by the second lamp unit 12 is relatively large, the power stored in the storage battery 16 is easily used up, thereby leading to a darker light output for the second lamp unit 12 and in eventual failure of the emergency exit lamp.

4. As the light output of the second lamp unit 12 grows darker due to insufficient power supplied by the storage battery 16, the two ends of the second lamp unit 12 turn black and can further shorten the service life of the second lamp unit 12.

FIG. 2 illustrates another conventional lamp control circuit 2 for controlling operation of an emergency exit lamp 20. When electric power is supplied by an external alternating current (ac) power source (V2), transformer circuit 22 and rectifier circuit 24 cooperatively reduce the voltage and convert the power into a dc power signal. Thereafter, oscillator 26 converts the dc power signal into a high voltage ac power signal to activate the lamp 20 to generate a light output. In the event of a power outage, the oscillator 26 converts the power output of storage battery 28 into the high voltage ac power signal to enable the lamp 20 to continue generating the light output. It is noted that the conventional lamp control circuit 2 suffers from the same drawbacks of the conventional lamp control circuit 1 described beforehand. 1. During a power outage, the oscillator 26 converts the dc voltage output of the storage battery 28 into the high voltage ac power signal for activating the lamp 20. Power consumption is thus increased because of the large amount of current that flows instantaneously to the lamp 20. Due to the large amount of current that flows instantaneously to the lamp 20 when the latter is activated, the temperature of electrical components in the vicinity of the lamp 20 is increased and can lead to a reduction in the service lives of the lamp 20 and the electrical components. Furthermore, because the power consumed by the lamp 20 is relatively large, the power stored in the storage battery 28 is easily used up, thereby leading to a darker light output for the lamp 20. Moreover, as the light output of the lamp 20 grows darker due to insufficient power supplied by the storage battery 28, the two ends of the lamp 20 turn black and can further shorten the service life of the lamp 20.

SUMMARY OF THE INVENTION

Therefore, the object of the present invention is to provide a circuit for controlling operation of an emergency exit lamp that can overcome the aforesaid drawbacks commonly associated with the conventional lamp control circuits.

More particularly, the object of the present invention is to provide a circuit for controlling operation of an emergency exit lamp that can prolong the service life of the lamp and ensure sufficient brightness of the light output of the lamp.

According to the present invention, a circuit for controlling operation of an emergency exit lamp comprises:

a starting circuit having an input side adapted to be connected to an external alternating current (ac) power source so as to receive an ac voltage signal therefrom, and an output side adapted to be connected to the lamp, the starting circuit being adapted to activate the lamp to generate a light output when the ac voltage signal from the external ac power source is present;

a rectifying and filtering circuit having an input side adapted to be connected to the external ac power source so as to receive the ac voltage signal therefrom, the rectifying and filtering circuit being adapted to rectify and filter the ac voltage signal from the external ac power source so as to generate a direct current (dc) voltage signal output;

a rechargeable storage battery connected to the output side of the rectifying and filtering circuit so as to be charged by the dc voltage signal output therefrom;

a trigger device including: an oscillator adapted to be connected to the lamp; a relay connected to the oscillator and the storage battery, the relay being operable in an activated state, where the storage battery is connected to the oscillator in order to enable the oscillator to generate a high voltage ac output for activating the lamp; and a trigger circuit connected to the storage battery and the relay, the trigger circuit being operable in an enabled state, where the relay is controlled to operate in the activated state; and a delay circuit connected to the output side of the rectifying and filtering circuit and the trigger circuit, the delay circuit controlling the trigger circuit to operate in the enabled state a preset time delay after the external ac power source ceases to provide the ac voltage signal.

In the preferred embodiment, the trigger circuit includes a switching transistor unit, and the delay circuit includes a charge-discharge circuit, such as a resistor-capacitor (RC) charge-discharge circuit, connected to the switching transistor unit. The charge-discharge circuit is charged by the dc voltage signal output of the rectifying and filtering circuit to maintain the switching transistor unit in a disabled state. The charge-discharge circuit discharges when the rectifying and filtering circuit ceases to generate the dc voltage signal output due to absence of the ac voltage signal from the external ac power source. The charge-discharge circuit permits operation of the trigger circuit in the enabled state after discharging for a time period corresponding to the preset time delay.

A voltage limiting circuit, such as a zener diode, can be connected to the storage battery and the relay in order disconnect the storage battery from the relay when a dc voltage output of the storage battery drops below a preset minimum value.

BRIEF DESCRIPTION OF THE DRAWINGS

Other features and advantages of the present invention will become apparent in the following detailed description of the preferred embodiment with reference to the accompanying drawing, of which.

DETAILED DESCRIPTION OF THE PREFERRED EMBODIMENT

Figure 1:
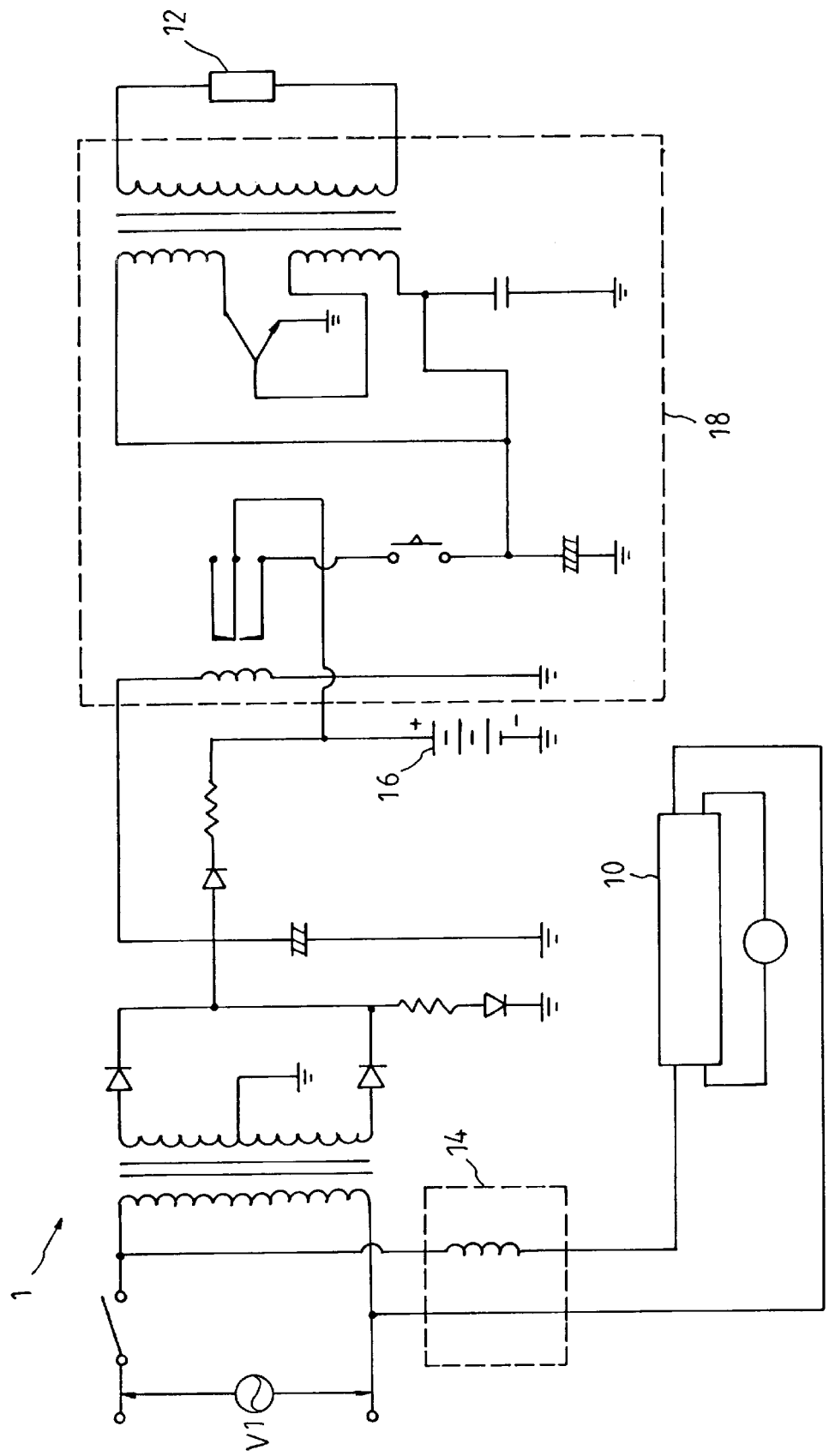
FIG. 1 is a schematic circuit diagram of a conventional circuit for controlling operation of an emergency exit lamp.
Figure 2:
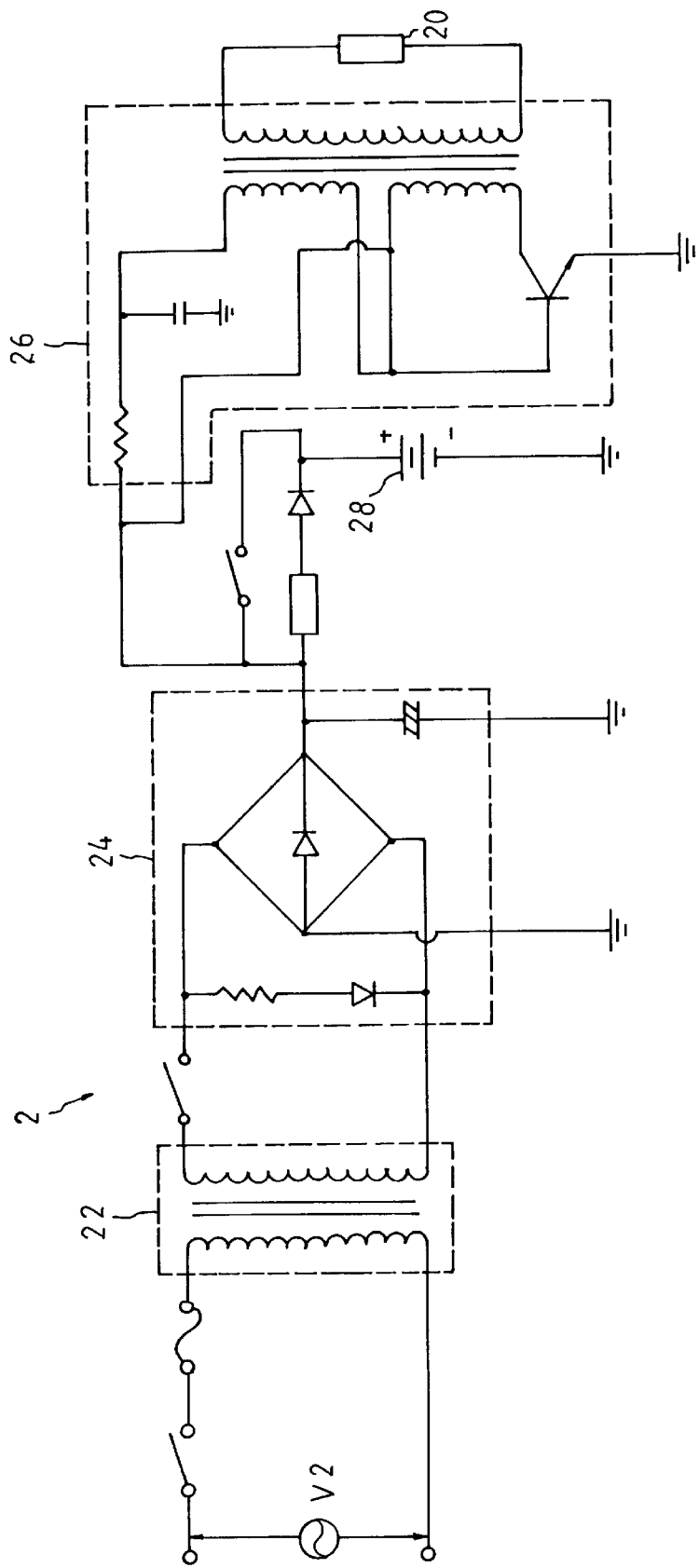
FIG. 2 is a schematic circuit diagram of another conventional circuit for controlling operation of an emergency exit lamp.
Figure 3:
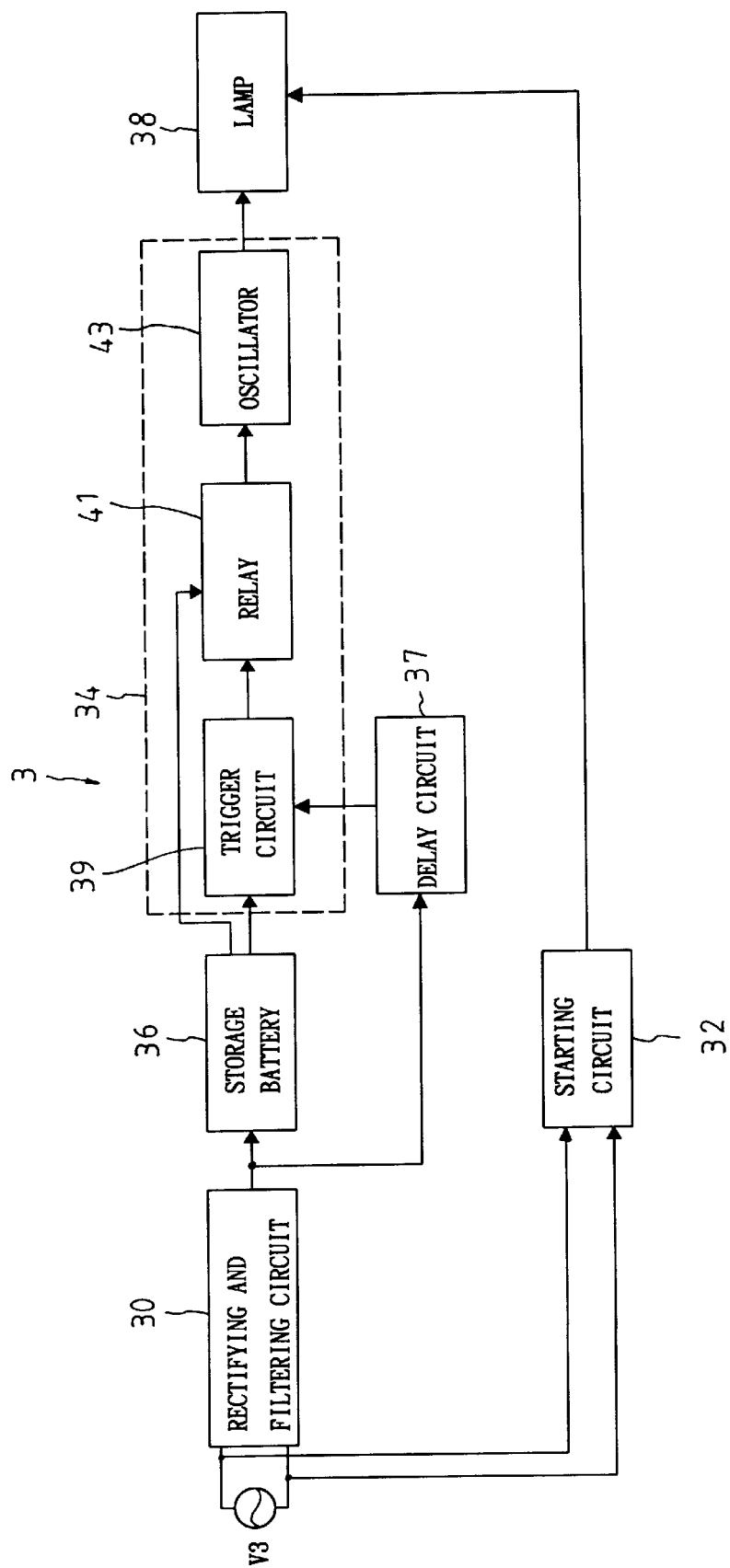
FIG. 3 is a schematic circuit block diagram of the preferred embodiment of a circuit for controlling operation of an emergency exit lamp according to the present invention.
Figure 4:
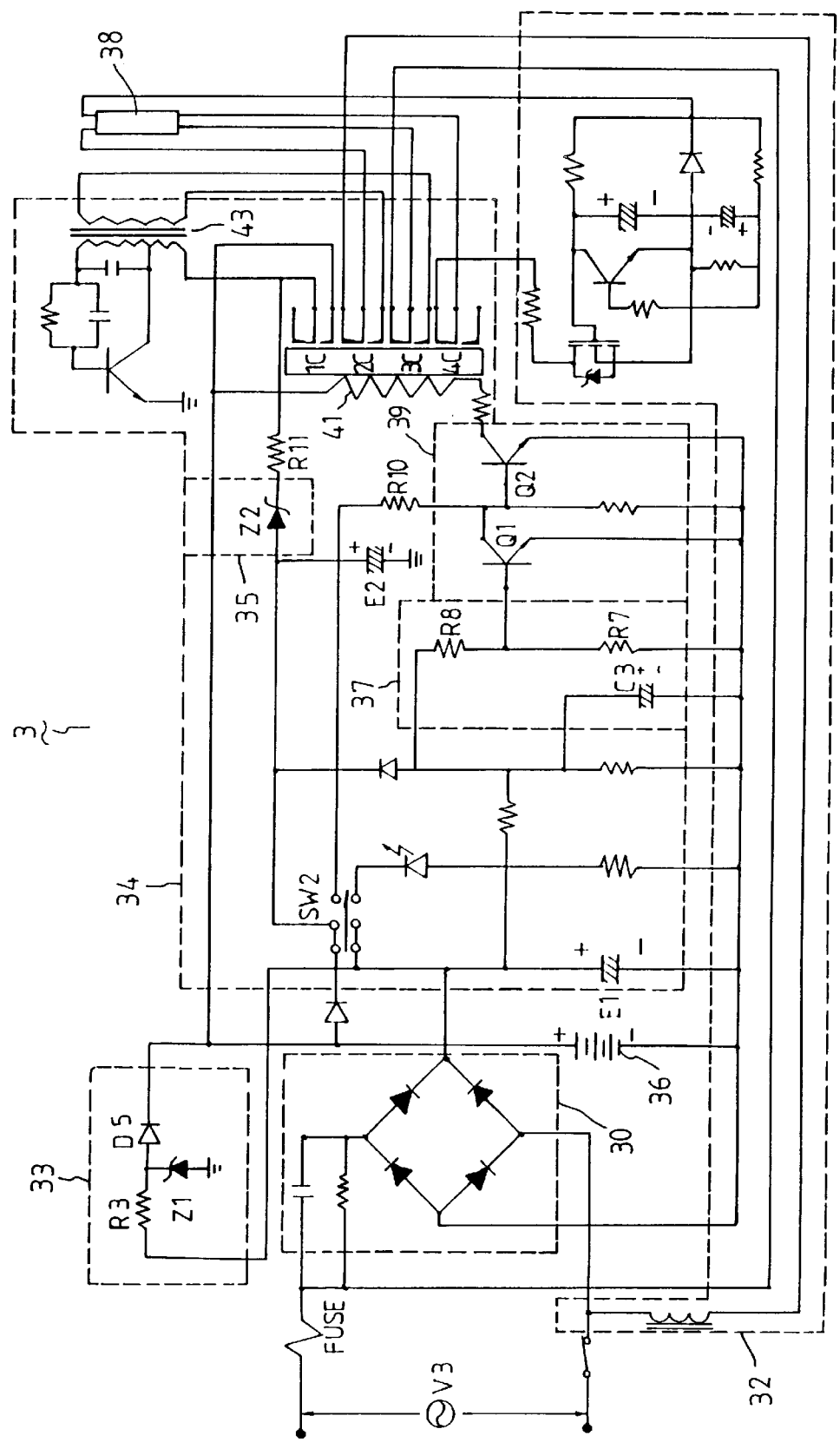
FIG. 4 is a schematic circuit diagram of the preferred embodiment.

Referring to FIGS. 3 and 4, the preferred embodiment of a circuit for controlling operation of an emergency exit lamp 38 according to the present invention is shown to comprise a rectifying and filtering circuit 30, a starting circuit 32, a trigger device 34, and a rechargeable storage battery 36.

The rectifying and filtering circuit 30 has an input side adapted to be connected to an external ac power source (V3) so as to receive an ac voltage signal therefrom, and an output side to be connected to the storage battery 36. The rectifying and filtering circuit 30 is adapted to rectify and filter the ac voltage signal from the external power source (V3) so as to generate a dc voltage signal output for charging the storage battery 36.

The starting circuit 32 has an input side adapted to be connected to the external ac power source (V3) so as to receive the ac voltage signal therefrom, and an output side adapted to be connected to the lamp 38. The starting circuit 32 is adapted to activate the lamp 38 to generate a light output when the ac voltage signal from the external ac power source (V3) is present.

The trigger device 34 includes an oscillator 43 adapted to be connected to the lamp 38, a relay 41 connected to the oscillator 43 and the storage battery 36, and a trigger circuit 39 connected to the storage battery 36 and the relay 41. The relay 41 is operable in an activated state, where the storage battery 36 is connected to the oscillator 43 in order to enable the latter to generate a high voltage ac output for activating the lamp 38. The trigger circuit 39 is operable in an enabled state, where the relay 41 is controlled to operate in the activated state. A delay circuit 37 is connected to the output side of the rectifying and filtering circuit 30 and to the trigger circuit 39. The delay circuit 37 controls the trigger circuit 39 to operate in the enabled state a preset time delay after the external ac power source (V3) ceases to provide the ac voltage signal.

The trigger circuit 39 includes a switching transistor unit consisting of first and second transistors (Q1, Q2). The collector of the second transistor (Q2) is connected to the relay 41. The collector of the first transistor (Q1) is connected to the base of the second transistor (Q2). The delay circuit 37 includes a resistor-capacitor charge-discharge circuit having resistors (R7, R8) connected to the base of the first transistor (Q1), and a capacitor (C3) connected across the resistors (R7, R8).

A voltage limiting circuit 35 is connected to the storage battery 36 and the relay 41. In this embodiment, the voltage limiting circuit 35 includes a zener diode (Z2) connected in series between the storage battery 36 and the relay 41. A voltage drop circuit 33 interconnects the rectifying and filtering circuit 30 and the storage battery 36. The voltage drop circuit 33 includes a resistor (R3), a diode (D5) and a zener diode (Z1) connected to a junction of the resistor (R3) and the diode (D5).

When the external ac power source (V3) provides the ac voltage signal under normal conditions, the starting circuit 32, which includes known ballast and starter components, activates directly the lamp 38 to generate the light output for indicating an emergency exit. At the same time, the ac voltage signal from the external ac power source (V3) is rectified and filtered by the rectifying and filtering circuit 30 so as to generate the dc voltage signal output. The dc voltage signal output serves as an input to the voltage drop circuit 33. Due to the presence of the zener diode (Z1), the voltage drop circuit 33 reduces the amplitude of the dc voltage signal output to an appropriate level, such as 7.5 volts. The output of the voltage drop circuit 33 is then used to charge the storage battery 36. The capacitor (C3) of the delay circuit 37 is charged by the dc voltage signal output of the rectifying and filtering circuit 30 to maintain the trigger circuit 39 in a disabled state.

In the event of a power outage, the storage battery 36 will be connected to the oscillator 43 when the relay 41 is activated. However, it is only after the capacitor (C3) of the delay circuit 37 has discharged via the resistors (R7, R8) will the transistors (Q1, Q2) of the trigger circuit 39 be enabled to activate the relay 41 in order to establish connection between the storage battery 36 and the oscillator 43 and in order to enable the oscillator 43 to generate a high voltage ac signal for activating the lamp 38 when the rectifying and filtering circuit 30 ceases to generate the dc voltage signal output due to the occurrence of a power outage, i.e. the external ac power source (V3) ceases to provide the ac voltage signal. As such, during the discharging of the capacitor (C3), which is the time delay that is introduced by the delay circuit 37 to the activation of the relay 41 by the trigger circuit 39, a large instantaneous starting current rush to the lamp 38 can be avoided to reduce the starting current flow to the lamp 38.

Moreover, due to the voltage limiting capability of the zener diode (Z2) of the voltage limiting circuit 35 that is provided between the storage battery 36 and the relay 41, the storage battery 36 can be disconnected from the relay 41 when the dc voltage output of the former drops below a minimum value, thereby avoiding operation of the lamp 38 with a low brightness output to minimize the occurrence of darkening of the two ends of the lamp 38. When the voltage limiting circuit 35 disconnects the storage battery 36 from the relay 41, a switch (SW2) can be operated such that a first condenser (E1) discharges via a resistor (R10) to allow the transistor (Q2) of the trigger circuit 39 to conduct in order to activate the relay 41. At the same time, a second condenser (E2) connected to the storage battery 36 discharges via the voltage limiting circuit 35 and a resistor (R11). The storage battery 36 is once again connected to the oscillator 43 via the relay 41 to permit generation of the high voltage ac signal for activating the lamp 38. Thus, by operating the switch (SW2), the lamp 38 can be activated to continue generating the light output for a short period of time even when the dc voltage output of the storage battery 36 has dropped below the minimum value.

The advantages of the circuit of the present invention are as follows:

1. Due to the delay circuit 37, which introduces a time delay to the activation of the relay 41 by the trigger circuit 39 in the event of a power outage, a large instantaneous starting current rush to the lamp 38 can be avoided to reduce the starting current flow to the lamp 38, thereby resulting in lower power consumption.

2. Because of the lower starting current to the lamp 38, overheating of the lamp 38 and the electrical components near the vicinity of the lamp 38 can be minimized to prolong the service lives of the same.

3. Because of the lower power consumption, the power stored in the storage battery 36 is not easily used up, thereby leading to a longer operating time of the lamp 38 under proper conditions.

4. Due to the voltage limiting circuit 35, the storage battery 36 can be disconnected when the dc voltage output thereof drops below a minimum value, thereby avoiding operation of the lamp 38 with a low brightness output to minimize the occurrence of darkening of the two ends of the lamp 38 so as to further prolong the service life of the lamp 38.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A circuit for controlling operation of an emergency exit lamp, comprising:

a starting circuit having an input side adapted to be connected to an external alternating current power source so as to receive an alternating current voltage signal therefrom, and an output side adapted to be connected to the lamp, said starting circuit being adapted to activate the lamp to generate a light output when the alternating current voltage signal from the external alternating current power source is present;

a rectifying and filtering circuit having an input side adapted to be connected to the external alternating current power source so as to receive the alternating current voltage signal therefrom, said rectifying and filtering circuit being adapted to rectify and filter the alternating current voltage signal from the external alternating current power source so as to generate a direct current voltage signal output;

a rechargeable storage battery connected to said output side of said rectifying and filtering circuit so as to be charged by the direct current voltage signal output therefrom;

a trigger device including
  an oscillator adapted to be connected to the lamp,
  a relay connected to said oscillator and said storage battery, said relay being operable in an activated state, where said storage battery is connected to said oscillator in order to enable said oscillator to generate a high voltage alternating current output for activating the lamp, and
  a trigger circuit connected to said storage battery and said relay, said trigger circuit being operable in an enabled state, where said relay is controlled to operate in the activated state; and a delay circuit connected to said output side of said rectifying and filtering circuit and said trigger circuit, said delay circuit controlling said trigger circuit to operate in the enabled state a preset time delay after the external alternating current power source ceases to provide the alternating current voltage signal.

2. The circuit for controlling operation of an emergency exit lamp as defined in claim 1, wherein said trigger circuit includes a switching transistor unit, said delay circuit including a charge-discharge circuit connected to said switching transistor unit, said charge-discharge circuit being charged by the direct current voltage signal output of said rectifying and filtering circuit to maintain said switching transistor unit in a disabled state, said charge-discharge circuit discharging when said rectifying and filtering circuit ceases to generate the direct current voltage signal output due to absence of the alternating current voltage signal from the external alternating current power source, said charge-discharge circuit permitting operation of said trigger circuit in the enabled state after discharging for a time period corresponding to the preset time delay.

3. The circuit for controlling operation of an emergency exit lamp as defined in claim 2, wherein said charge-discharge circuit is a resistor-capacitor charge-discharge circuit.

4. The circuit for controlling operation of an emergency exit lamp as defined in claim 1, further comprising a voltage limiting circuit connected to said storage battery and said relay, said voltage limiting circuit disconnecting said storage battery from said relay when a direct current voltage output of said storage battery drops below a preset minimum value.

5. The circuit for controlling operation of an emergency exit lamp as defined in claim 4, wherein said voltage limiting circuit includes a zener diode connected in series between said storage battery and said relay.

* * * * *